United States Patent [19]
Mamer-Boellstorff

[11] Patent Number: 5,311,837
[45] Date of Patent: May 17, 1994

[54] PET BED

[76] Inventor: Leslie Mamer-Boellstorff, R.R. 3, Box 125, Auburn, Nebr. 68305

[21] Appl. No.: 47,892

[22] Filed: Apr. 19, 1993

[51] Int. Cl.$^5$ ............................................. A01J 1/00
[52] U.S. Cl. ................................................. 119/28.5
[58] Field of Search ................ 119/28.5, 19, 165, 166, 119/169

[56] References Cited

U.S. PATENT DOCUMENTS

| | | | |
|---|---|---|---|
| D. 327,341 | 6/1992 | Barreto, III et al. | D30/108 |
| 3,533,376 | 10/1970 | Smith | 119/28.5 |
| 3,989,008 | 11/1976 | Neumann | 119/19 |
| 4,008,688 | 2/1977 | Nicholas | 119/159 |
| 4,064,835 | 12/1977 | Rabenbauer | 119/28.5 |
| 4,257,349 | 3/1981 | Carlin | 119/28.5 |
| 4,444,148 | 4/1984 | Lander | 119/166 X |
| 4,539,935 | 9/1985 | Meyer | 119/28.5 |
| 4,771,731 | 9/1988 | Derx et al. | 119/166 |
| 4,860,089 | 8/1989 | Stewart | 119/28.5 |
| 4,996,944 | 3/1991 | Zook et al. | 119/20 |
| 5,000,123 | 3/1991 | Morse et al. | 119/61 |
| 5,010,843 | 4/1991 | Henry | 119/28.5 |
| 5,144,911 | 9/1992 | Moore et al. | 119/28.5 |

FOREIGN PATENT DOCUMENTS 2211387 7/1989 United Kingdom ............... 119/28.5

Primary Examiner—Thomas Price
Attorney, Agent, or Firm—Henderson & Sturm

[57] ABSTRACT

This invention relates to a pet bed which is designed to be comfortable for the pet, easily cleaned, and exceptionally durable. The bed is constructed from a single piece molded plastic body with an oval, concave resting area for the pet. The resting surface has numerous holes which allow for ventilation for the animal and also provide for removal of water when the bed is cleaned as by spraying from a water hose. The peripheral support walls of the invention are fitted with several cutouts which increase ventilation, allow for the escape of water from beneath the bed during cleaning, and provide convenient hand-holds when lifting the bed. The bed also is fitted with a pair of snap hooks for securing it to a kennel fence.

3 Claims, 2 Drawing Sheets

PET BED

TECHNICAL FIELD

This invention relates generally to a bed for pets, and more particularly to a bed which is especially suitable for use in kennels.

BACKGROUND ART

Numerous designs for pet beds exist, but they typically sacrifice comfort for cleanliness or vice versa. Many of these beds utilize some sort of cushion for the pet to rest upon since the bed itself, without the cushion, is not comfortable for the pet. These cushions then become very soiled and odorous and are difficult to keep clean. Furthermore, most pet beds are easily destroyed by the animals since they are often made from non-durable materials and offer numerous comers and projections which the pets may easily chew.

DISCLOSURE OF THE INVENTION

This invention teaches a pet bed which is designed to be both comfortable for the pet and easily cleaned. The bed is constructed with a single piece molded plastic body having an oval, concave resting area for the pet. The resting surface has numerous holes which provide ventilation for the animal and also provide for removal of water when the bed is cleaned as by spraying from a water hose. The peripheral support walls of the invention are fitted with several cutouts which increase ventilation, allow for the escape of water from beneath the bed during cleaning, and provide convenient handholds when lifting the bed.

BRIEF DESCRIPTION OF THE DRAWINGS

These and other attributes of the invention will become more clear upon a thorough study of the following description of the best mode for carrying out the invention, particularly when reviewed in conjunction with the drawings, wherein.

BEST MODE FOR CARRYING OUT THE INVENTION

Figure 1:
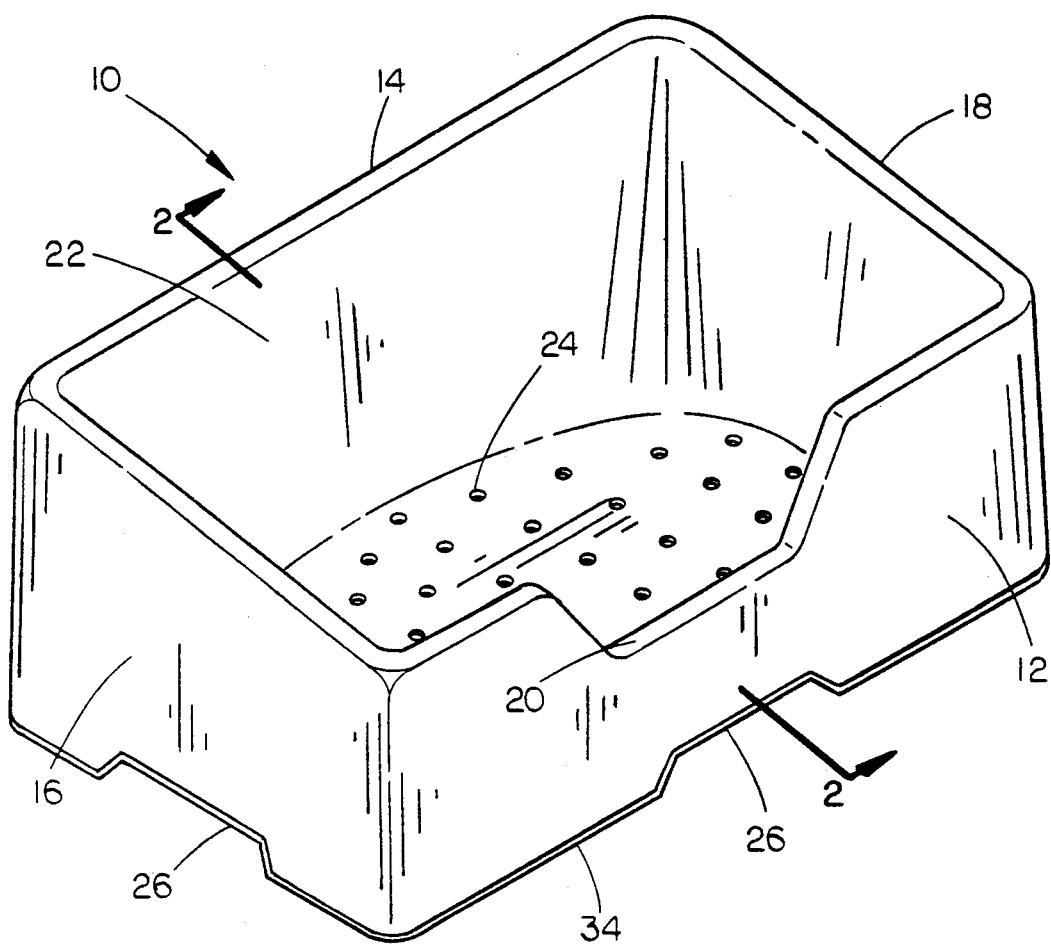
FIG. 1 is a perspective view of the front of the invention.

Referring now to the drawings, wherein like reference numerals designate identical or corresponding parts throughout the several views, FIG. 1 depicts a frontal view of the invention 10, which has been formed as a single piece of molded plastic utilizing conventional molding techniques. The peripheral wall and base of the bed are rectangular in shape with a front 12, a rear 14, a left side 16, and a right side 18. The interior resting area 22 of the bed is a concave, oval surface which is designed to more comfortably conform to an animal's body as it curls its body to lie down. It should be noted that all comers and edges of the bed are smoothly rounded so as to eliminate any area which is susceptible to chewing by the animal. The front 12 of the bed has a cutout area 20 molded into its upper edge which facilitates entry and exit from the bed by a smaller animal. The resting area 22 of the bed is held elevated above the surface upon which the bed rests and is formed with numerous apertures 24 therein which function to increase ventilation to the animal lying within the bed. These apertures 24 also provide means for water to drain from within the resting area when the bed is cleaned as by spraying it with a hose. This would be especially convenient for kennels.

The bed is formed with a plurality of cutouts 26 along the base of the peripheral wall. These cutouts, preferably one on each edge, permit increased ventilation to the animal and also serve to drain water from beneath the bed when it is cleaned with a water hose and is resting upon a level surface. Further, these cutouts provide convenient handholds for lifting the bed.

Figure 2:
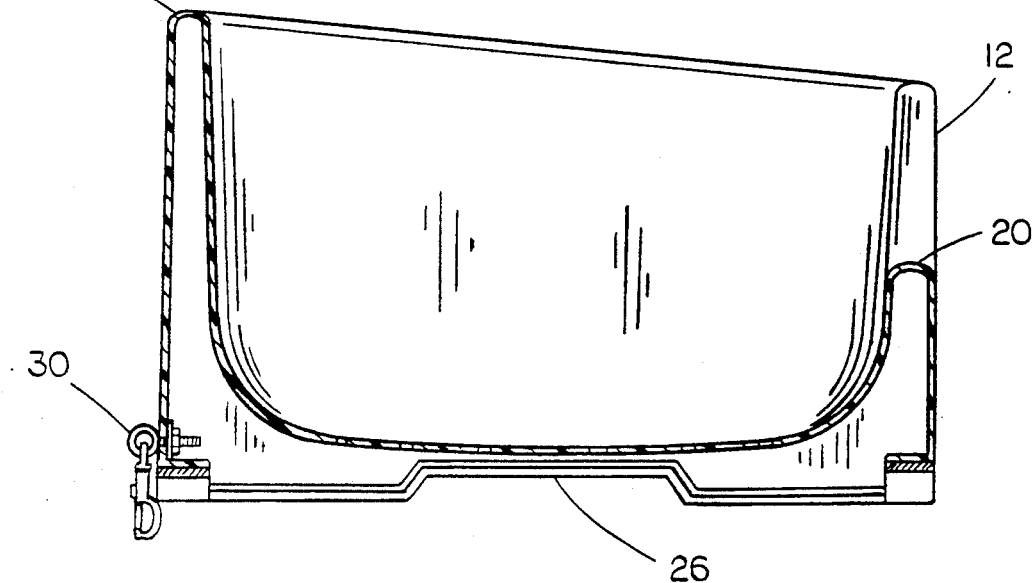
FIG. 2 is a side cross-sectional view of the invention.
Figure 3:
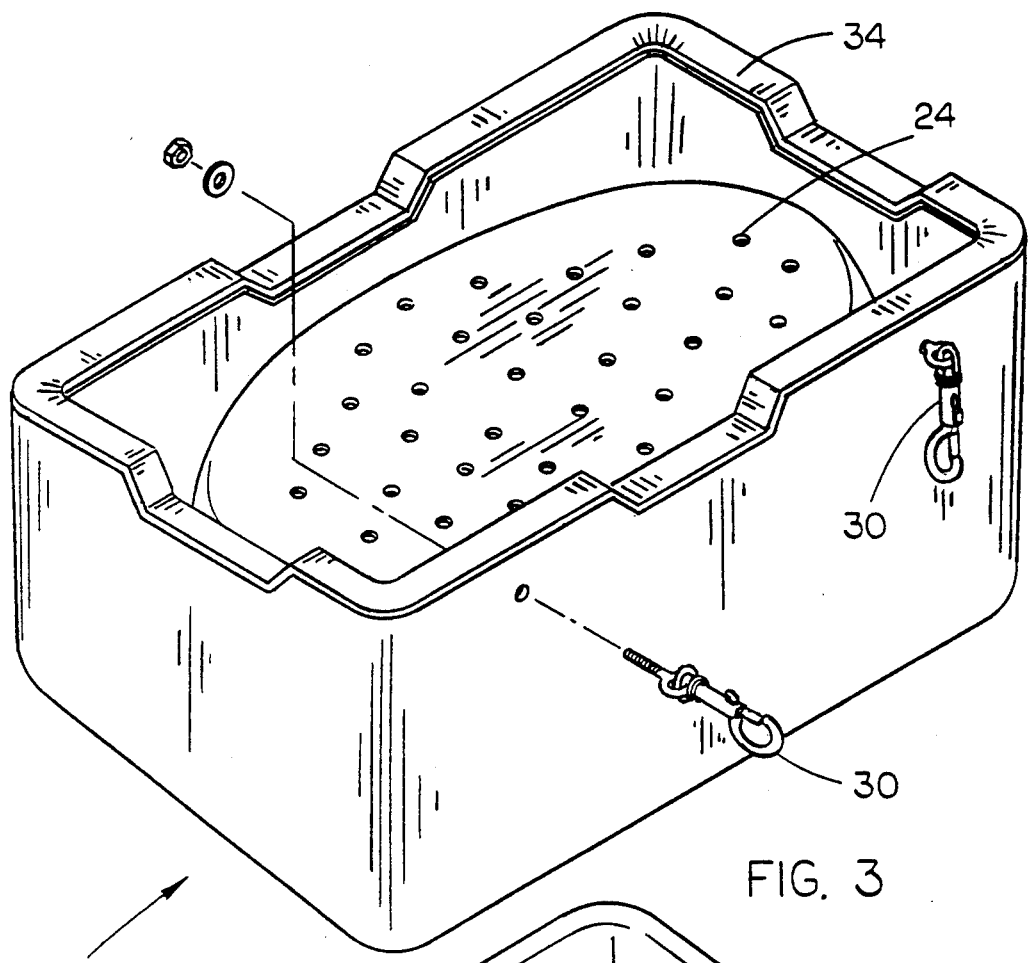
FIG. 3 is a perspective view showing the bottom of the invention from the rear.
Figure 4:
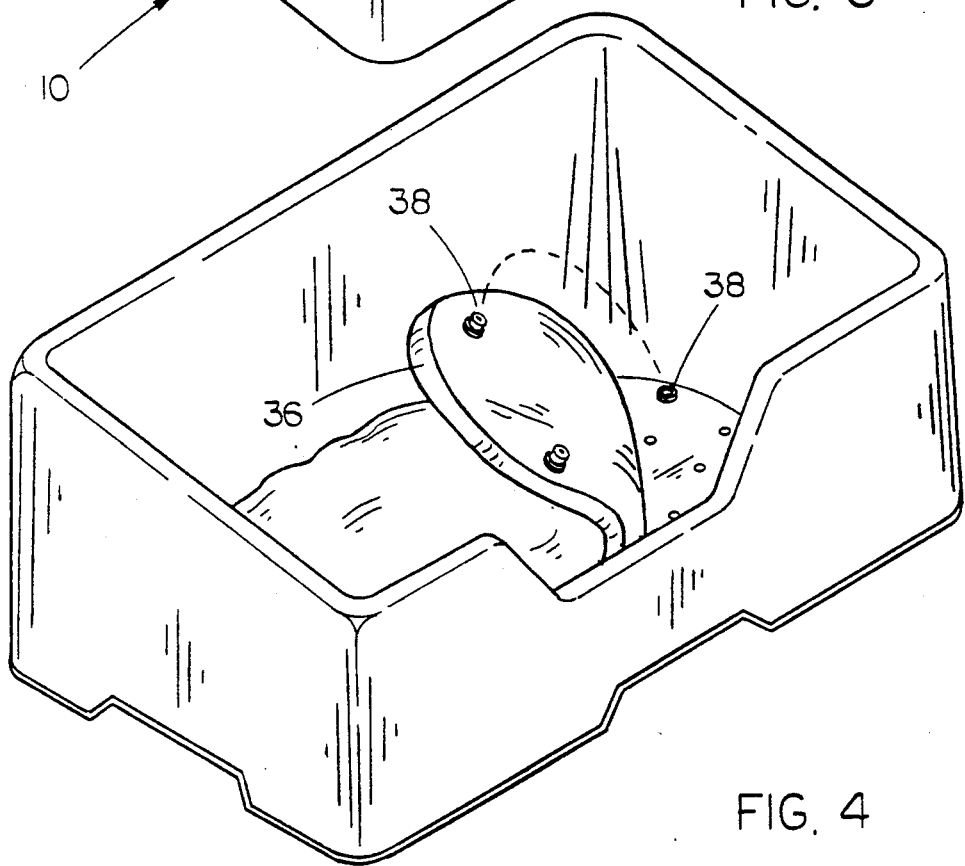
FIG. 4 is a second perspective view of the front of the invention.

As seen in FIG. 2 and FIG. 3, the pet bed is fitted with hardware 30 which allows for easily securing the bed to a chain link fence or other structure common in kennels. The preferred embodiment utilizes a pair of snap hooks, although other means may be used as well. This attachment prevents the animal from moving the bed about and from overturning it. These figures also show the non-skid strip 34 which is secured to the base of the peripheral wall and functions to prevent unwanted sliding of the bed over smooth surfaces. As seen in FIG. 4, the bed may also be equipped with a mattress 36 for increased animal comfort and warmth. This mattress is secured into position with the use of several button snaps 38. Of course hook and loop fasteners or other types could also be used.

Obviously, many modifications and variations of the present invention are possible in light of the above teachings. It is therefore to be understood that, within the scope of the appended claims, the invention may be practiced otherwise than as specifically described.

I claim:

1. A pet bed consisting of:
a molded plastic apparatus having an interior structure provided with a bottom portion and a peripheral structure; said interior structure having a concave, oval configuration; said peripheral structure having a rectangular configuration with substantially vertical supporting walls; said interior structure having a plurality of apertures formed in the bottom portion; wherein, the bottom portion is elevated above the surface upon which said peripheral supporting wall rests; and, wherein said peripheral supporting wall has a plurality of cutouts formed in the lower edge thereof; a non-skid strip affixed to said lower edge; and, an externally mounted releasable securing means for securing the bed to a horizontally spaced object; and further comprising a cushioned pad and a plurality of fastening means for securing said cushion to the bottom portion of the interior structure.

2. The pet food as recited in claim 1 wherein said molded plastic apparatus has a front and a rear, said front having a cutout to facilitate the entry and exit of a small animal.

3. The pet bed as recited in claim 2 wherein said rear is higher than said front.

* * * * *

UNITED STATES PATENT AND TRADEMARK OFFICE
CERTIFICATE OF CORRECTION

PATENT NO. : 5,311,837
DATED : May 17, 1994
INVENTOR(S) : Leslie Mamer-Boellstorff It is certified that error appears in the above-identified patent and that said Letters Patent is hereby corrected as shown below:

Column 1, line 18  "comers" should read --corners--

Signed and Sealed this

Sixth Day of June, 1995

Attest:

BRUCE LEHMAN

Attesting Officer

Commissioner of Patents and Trademarks